(12) United States Patent
Suzuki et al.

(10) Patent No.: US 7,232,245 B2
(45) Date of Patent: *Jun. 19, 2007

(54) INTERIOR ILLUMINATION LAMP

(75) Inventors: Hiroyuki Suzuki, Haibara-gun (JP); Kimihiro Ishii, Haibara-gun (JP); Motoya Kimura, Toyota (JP); Hiroshi Ando, Kariya (JP)

(73) Assignee: Yazaki Corporation, Tokyo (JP)

( * ) Notice: Subject to any disclaimer, the term of this patent is extended or adjusted under 35 U.S.C. 154(b) by 22 days.

This patent is subject to a terminal disclaimer.

(21) Appl. No.: 10/969,213

(22) Filed: Oct. 21, 2004

(65) Prior Publication Data

US 2005/0168998 A1 Aug. 4, 2005

(30) Foreign Application Priority Data

Oct. 22, 2003 (JP) .............................. 2003-361795

(51) Int. Cl.
*B60Q 1/00* (2006.01)
*B60Q 1/26* (2006.01)

(52) U.S. Cl. ..................................... 362/488
(58) Field of Classification Search ................. 362/488
See application file for complete search history.

(56) References Cited

U.S. PATENT DOCUMENTS 5,377,087 A * 12/1994 Yoon .......................... 362/275

6,578,994 B1 * 6/2003 Beyerlein .................... 362/490

FOREIGN PATENT DOCUMENTS

JP 58126231 A * 7/1983 ................. 362/488
JP 2000-1141 A 1/2000

* cited by examiner

*Primary Examiner*—Ali Alavi
*Assistant Examiner*—William J Carter
(74) *Attorney, Agent, or Firm*—Sughrue Mion, PLLC

(57) ABSTRACT

A bezel member (52) to which a lens (54) which transmits light from a light source (37) is supported on a main body (30) to be fixed to a vehicle body (11). A spherical surface (52*a*) is formed on one of the main body (30) or a bezel member (52), and sliding members (34) for being pressed against the spherical surface (52*a*) are formed on the other one of them, so that the bezel member (52) can be rotated with respect to a supporting member (33) of the main body (30) and fixed to a given position. Since a metal plate is used as the sliding members (34) in this interior illumination lamp (10), a problem such that the light source cannot be fixed to the desired direction due to abrasion or change of properties of the felt sliding member as in the related art due to the temperature or deterioration with age can be solved. Also, in comparison with the case in which the spring or the like is employed, increase in cost due to increase in the number of parts can be avoided.

5 Claims, 8 Drawing Sheets

INTERIOR ILLUMINATION LAMP

BACKGROUND OF THE INVENTION

1. Field of the Invention

The present invention relates to an interior illumination lamp and, for example, to an interior illumination lamp to be mounted to a door, a ceiling, or the like of a motor vehicle.

2. Related Art

In the related art, an interior illumination lamp is shown in FIG. 10, for example, Unexamined Japanese Patent Publication 2000-1141.

The interior illumination lamp is to be used by mounting to a back door of a station wagon, and is adapted to illuminate a luggage room provided at the rear or the lower part of the opened back door of the station wagon by changing the direction of illumination.

As shown in FIG. 10, an interior illumination lamp 100 includes a lamp housing 102 mounted to a trim 101 defining a wall surface of the back door, and a circular opening 103 provided forwardly of the lamp housing 102. A lamp supporting member 104 having a spherical inner surface is provided rearwardly of the opening 103 (rightward in FIG. 10), and a lamp body 105 in the shape of partial sphere is provided inside the lamp supporting member 104 so as to be change in direction by 360° within a predetermined range. The lamp body 105 includes a bulb 106 disposed therein, and a lens member 107 projecting from the opening 103 of the lamp housing 102 provided on the front surface (left surface in FIG. 10). A space S is provided between the lens member 107 and the opening 103 so as to constrain the amount of rotation of the lamp body 105.

In the above-described interior illumination lamp 100, the direction of the lamp body 105 having the bulb 106 attached thereon can be changed by 360° within the predetermined range, and the change of direction is performed by moving the lens member 107 by hand. In this case, in such the interior illumination lamp 100, fixation of the lamp body 105 which is directed to a desired direction is normally achieved by frictional resistance of felt provided between the inner surface of the lamp supporting member 104 and the outer surface of the lamp body 105. Therefore, there is a problem such that when the resiliency of the felt is reduced by exposure to a high temperature or deterioration with age, the lamp body 105 cannot be fixed at the desired direction.

In order to cope with this problem, usage of a spring and a ball which are little affected by the temperature or deterioration with age is also conceivable. However, in this case, the number of parts increases, and hence the cost is increased correspondingly, and the structure becomes complex.

SUMMARY OF THE INVENTION

In view of such circumstances, it is an object of the present invention to provide an interior illumination lamp having a moving and fixing mechanism with simple structure and high durability.

In order to achieve an object, the present invention provides an interior illumination lamp including a main body to be fixed to a vehicle body, and a bezel member being supported by a supporting member provided on the main body and having a lens which can transmit light from a light source, wherein the direction of the optical axis can be adjusted by rotating the bezel member with respect to the main body by causing a spherical surface provided on one of the main body and the bezel member and a sliding member provided on the other one of the main body and the bezel member, wherein the sliding member can be resiliently pressed against the spherical surface.

In the interior illumination lamp configured as described above, the bezel member including a lens which transmits light from the light source attached thereto is supported by the supporting member on the main body, which is fixed to the vehicle body. In other words, the spherical surface is provided on one of the main body or the bezel member and the sliding member which slides with respect to the spherical surface is provided on the other one of those, and by causing the sliding member to be pressed resiliently against the spherical surface, the bezel member can rotate with respect to the main body and is fixed to a given position. The sliding member may be a metal plate, or may be a resin plate or the like. The shape of the sliding member may be, for example, T-shape, but it may be L-shape, Y-shape, or J-shape as desired.

Therefore, according to this interior illumination lamp, with the provision of the sliding member, which is capable of being pressed resiliently, such problem that the light source cannot be fixed to the desired direction due to abrasion or change of properties of the felt sliding member due to the temperature or deterioration with age as in the related art can be solved. Also, in comparison with the case in which the spring or the like is employed, the number of parts can be reduced, and hence increase in cost due to increase in the number of parts can be avoided.

The present invention is provided in that the sliding member slides with respect to a recessed spherical surface provided on the inner side of the bezel member.

In the interior illumination lamp configured in this manner, by causing the sliding member to be pressed against the recessed spherical surface provided inside the bezel member, the bezel member can be freely rotated, and the optical axis can be positioned in the desired direction.

The present invention is also provided in that a plurality of the sliding members are provided at radial positions with respect to the spherical surface, and a guiding member for guiding the spherical surface is provided between the respective sliding members.

In the interior illumination lamp configured as described above, since a plurality of the sliding members are provided at the radial positions on the spherical surface, the bezel member can be stably rotated and fixed. Also, with the provision of the guiding member between the sliding members, the bezel member is prevented from being rattled with respect to the main body and hence can be rotated smoothly, so as to be fixed reliably to a desired position.

The present invention is also provided in that the respective sliding members are formed substantially into a T-shape along the identical circumferential direction of the spherical surface.

In the interior illumination lamp configured in this manner, by forming the sliding members are formed substantially into a T-shape, and disposing the same in the identical circumferential direction with respect to the spherical surface, the bezel member can be rotated and fixed stably with respect to the main body.

Also, the present invention is provided in that the sliding members include projections which are capable of coming into point contact with the spherical surface.

In the interior illumination lamp configured in this manner, by causing the projections provided on the sliding members to be pressed against the spherical surface, the bezel member can be rotated and fixed with respect to the main body with a suitable friction.

According to the present invention, the problem in the related art such that the resiliency of the felt is reduced due to exposure to a high temperature or deterioration with age, and hence the bezel member cannot be fixed at the desired direction can be solved. Also, in comparison with the case in which a combination of a spring and a ball which are hardly affected by the temperature or deterioration with age are employed, such a problem that the number of components increase can be avoided. Accordingly, there is provided an interior illumination lamp having a moving and fixing function with a simple structure and high durability.

DETAILED DESCRIPTION OF THE PREFERRED EMBODIMENTS

Figure 1:
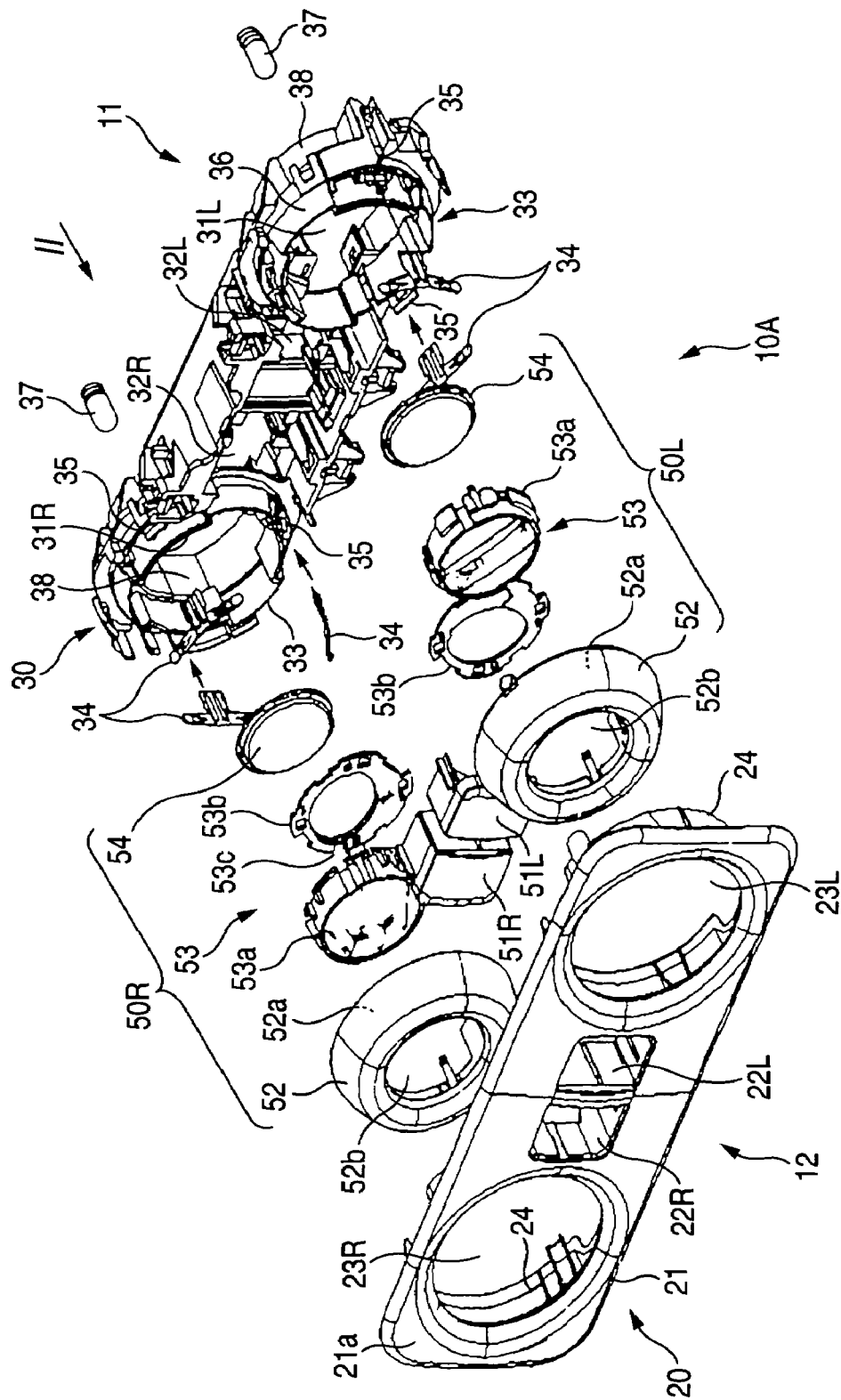
FIG. 1 is an exploded perspective view showing an embodiment of an interior illumination lamp according to the present invention.

Referring now to the drawings, an embodiment of the present invention will be described.

As shown in FIG. 1, an interior illumination lamp 10 according to the embodiment of the present invention includes a decorative member 20 exposed to a cabin 12 (see FIG. 7), and a functioning body 30 located inside the decorative member 20 as a main body provided with various electrical components mounted thereon.

Figure 7:
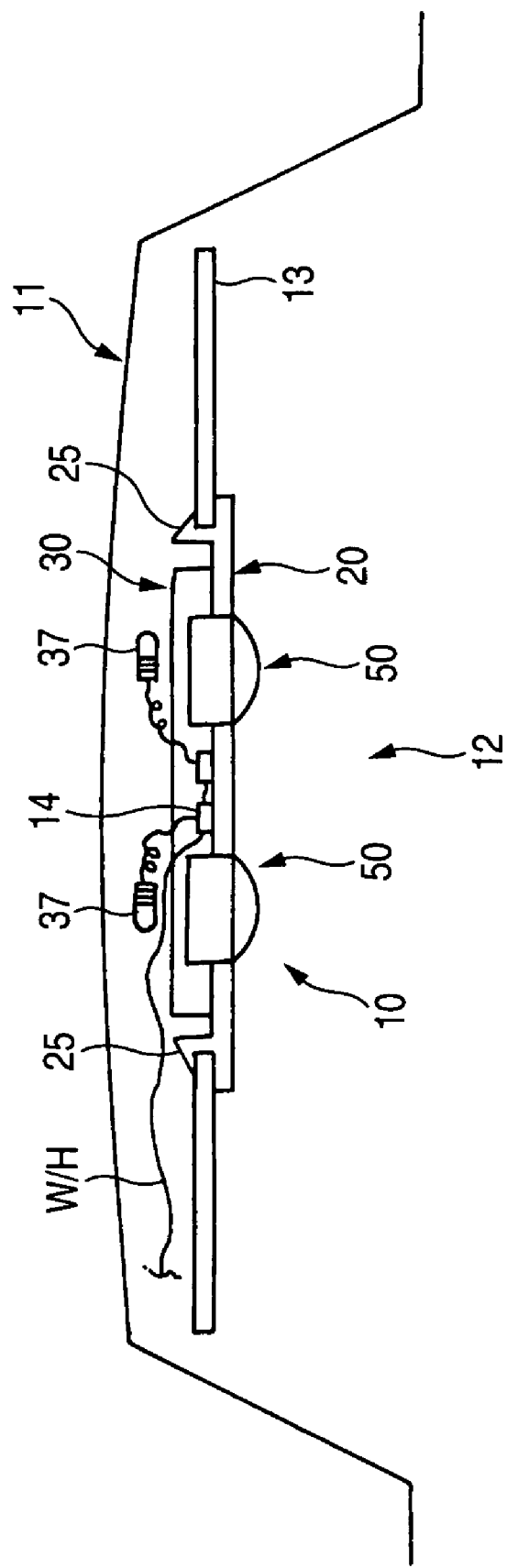
FIG. 7 is a cross-sectional view showing a sate in which the interior illumination lamp according to the present invention is attached to a vehicle body.

As shown in FIG. 7, the interior illumination lamp 10 is configured such that the decorative member 20 is attached to an interior material (trim) 13 provided inside a vehicle body 11, so as to be capable of being connected easily to a wire harness W/H distributed on the back side of the interior material 13 in advance.

Figure 2:
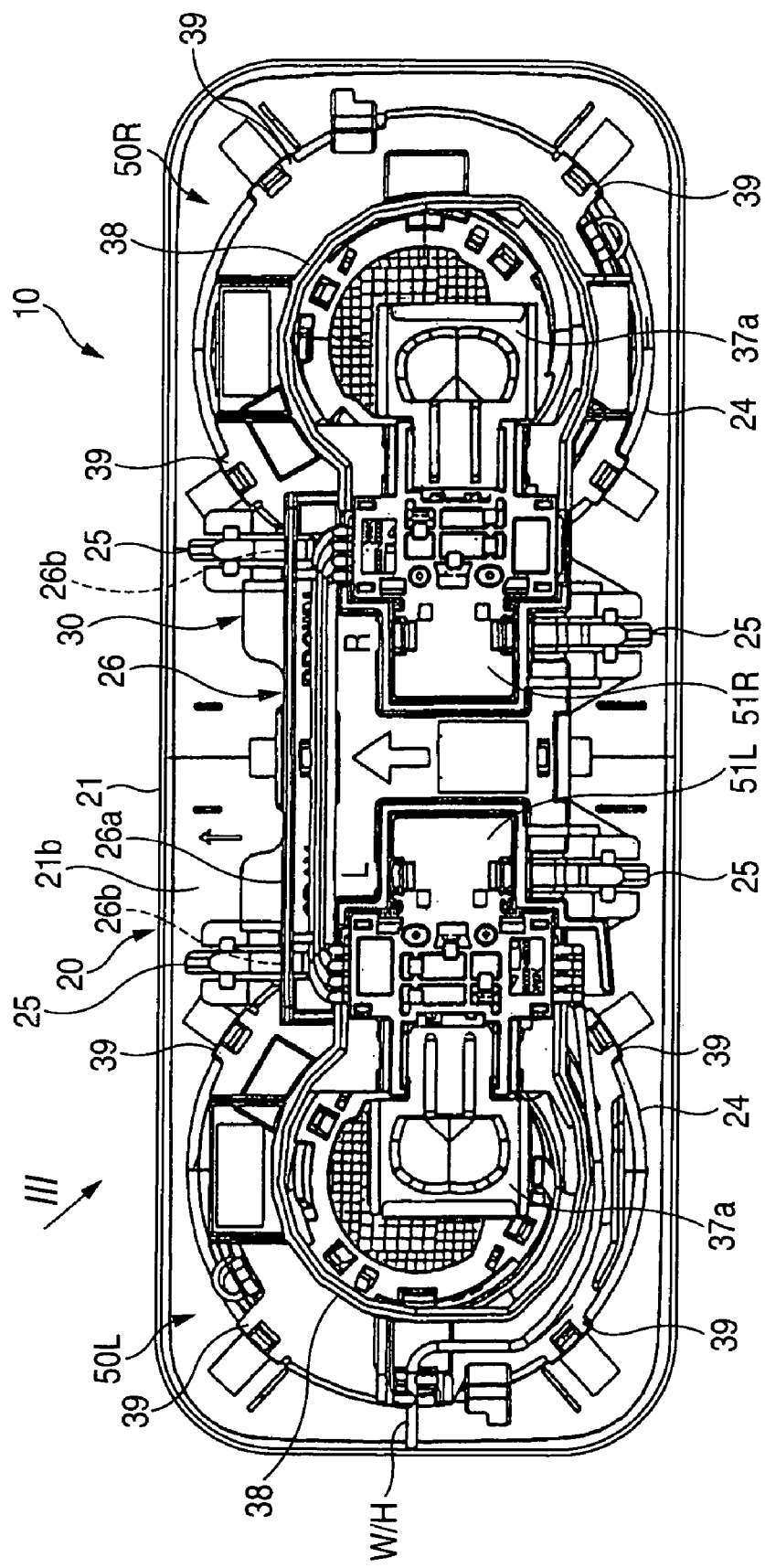
FIG. 2 is a back view of the interior illumination lamp viewed in the direction II in FIG. 1.
Figure 3:
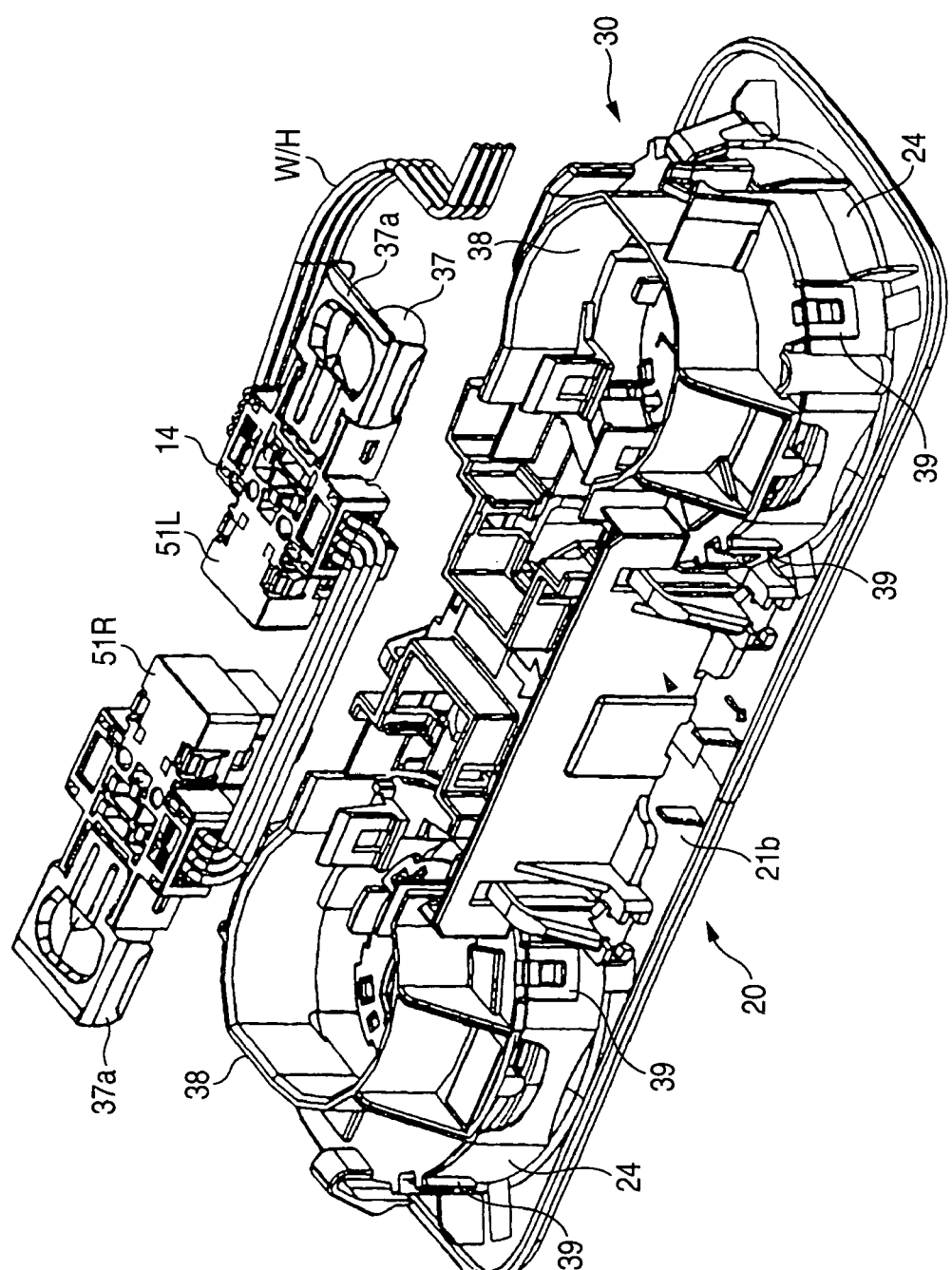
FIG. 3 is a perspective view when viewed in the direction III in FIG. 2.

As sown in FIG. 1 to FIG. 3, the decorative member 20 has a surface 21a exposed to the cabin 12 and includes a frame 21 formed, for example, into a square shape. At the center of the frame 21, there are provided switch holes 22L, 22R for exposing left and right switches 51L, 51R to the cabin 12. On the left and right portion of the frame 21, lamp holes 23L, 23E for exposing the left and right lamps 50L, 50R to the cabin 12 are provided. The respective lamp holes 23L, 23R are formed with a substantially cylindrical mounting portions 24 for attaching a functioning body 30 to the frame 21 so as to extend inward from a back surface 21b of the frame 21. On the back surface 21b of the frame 21 is provided with a clip 25 (see FIG. 7) for mounting the frame 21 to the interior material 13 of the ceiling of the cabin 12.

As shown in FIG. 1 to FIG. 3, the functioning body 30 is a generally oval shaped frame member, and is provided with lamp receiving holes 31L, 31R for receiving lamps 50L, 50R at the left and right ends thereof. At the center of the functioning body 30, there are provided switch storages 32L, 32R for attaching the switches 51L, 51R between the both lamp receiving holes 31L, 31R. The switches 51L, 51R can be easily attached and detached by connecting a connector 14 attached to the distal end of the wire harness W/H to a connecting terminal thereof (see FIG. 7).

The edges of the both lamp receiving holes 31L, 31R are provided with circular ring members 33 as a supporting member for supporting the lamps 50L, 50R, respectively. The respective ring members 33 are provided with column shaped guiding members 38 projecting from the back sides of the functioning body 30 (right side in FIG. 1), and the left and right guiding member 38 are notched at the opposed portions, so that the various electrical components, such as the switches 51L, 51R or bulbs 37 as the light source can be mounted. The guiding member 38 is taller than any electrical components to be mounted, and hence serves to prevent the electrical components from coming into conflict with the vehicle body 11. The left and right guiding members 38 are adapted so that bulbs 37 can be attached therein, respectively. A reflecting board 37a is provided behind the bulb 37 (upper side in FIG. 3), so that light emitted from the bulb 37 can be irradiated to a desired direction effectively.

Figure 4:
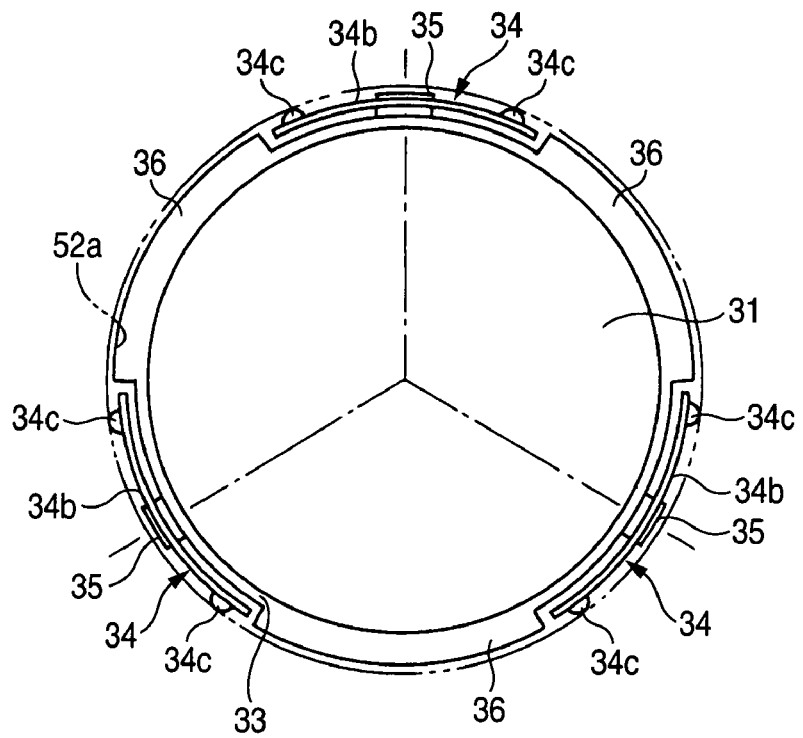
FIG. 4 is a plan view of a lamp receiving hole according to the present invention.
Figure 5:
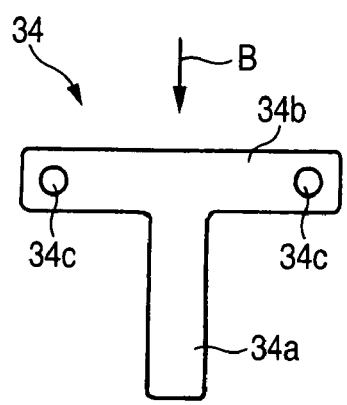
FIG. 5(A) is a front view showing an example of a sliding member.
FIG. 5(B) is a plan view.
Figure 5:
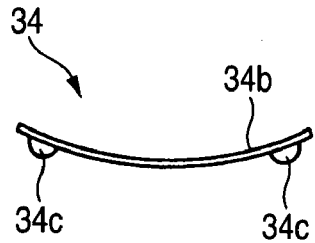

As shown in FIG. 1 and FIG. 4, sliding member mounting recesses 35 for mounting sliding members 34 formed of metal on the inner peripheral surface of the ring member 33, for example, at three equally spaced positions. The sliding member 34 is, as shown in FIG. 5(A), formed generally into a T-shape, and includes a supporting post 34a, and a supporting arm 34b which is orthogonal to the supporting post 34a and is curved into a partial circle. The supporting arm 34b is formed with projections 34c, for example, in a partial spherical shape so as to project outward at the left and right ends on the outer peripheral surface thereof, and the distal ends of all the projections 34c of the respective sliding members 34 are to be disposed on an identical spherical surface 52a.

The sliding member 34 may be formed of resin, and may be formed into a shape other than a substantially T-shaped form.

Here, the sliding member 34 is attached by inserting the supporting post 34a into the sliding member mounting recess 35 so that the projections 34c are projected outward. The supporting post 34a and the supporting arm 34b are members having resiliency and hence the projections 34c are constantly pressed against the spherical surface 52a by the resiliency.

Figure 6:
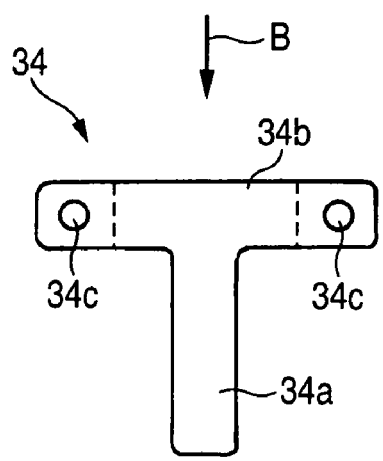
FIG. 6(A) is a front view showing another example of the sliding member.
FIG. 6(B) is a plan view.
Figure 6:
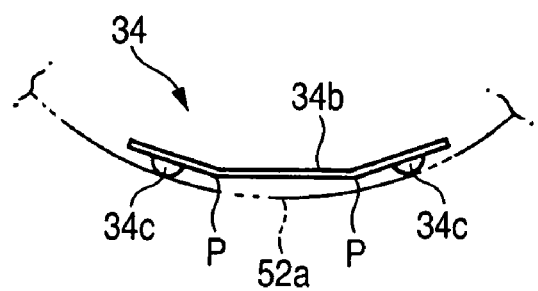

As shown in FIGS. 6(A) and (B), the supporting arm 34b may be formed by bending linearly. However, it is necessary to make a bending point P position inwardly of the spherical surface 52a passing the tips of the projections 34c.

As shown in FIG. 1 and FIG. 4, guiding members 36 are provided so as to project from the outsides of the ring members 33 of the lamp receiving holes 31L, 31R. The outer surfaces of the guiding members 36 fill the space between the adjacent siding members 34 concentrically when the supporting posts 34a of the sliding members 34 are fitted into the sliding member mounting recesses 35, and are positioned inwardly of a concentric circle (spherical surface 52a) connecting the tips of the projections 34c, which is a sliding surface of the sliding members 34.

The outer surfaces of the ring members 33 are formed with a plurality of locking claws 39 for mounting the functioning body 30 at given intervals. Therefore, the functioning body 30 and frame 21 of the decorative member 20 are connected by placing the mounting portions 24 of the decorative member 20 between the locking claws 39 and the ring member 33.

As shown in FIG. 1, the left and right lamps 50L, 50R are attached between the decorative member 20 and the functioning body 30. Since the left and right lamps 50L, 50R are identical, they are described simply as a lamp 50 unless otherwise required in the description below.

The lamp 50 includes an outer bezel 52, an inner bezel 53, and a lens 54, and irradiates light emitted from the bulb 37 to a predetermined direction.

The outer bezel 52 has a size projecting from the lamp holes 23L, 23R of the decorative member 20 into the cabin 12 at the distal portion thereof, and is generally formed into a partial sphere with the recessed spherical surface 52a formed on the inner surface. It also has a window 52b to which the lens 54 is fitted at the center thereof.

The inner bezel 53 includes a column shaped bezel body 53a and a lens holder 53b provided on the bezel body 53a so as to be capable of opening and closing via a hinge 53c. Therefore, the lens 54 is retained by fitting the projecting surface of the lens 54 into the rear end portion of the bezel body 53a and closing the lens holder 53b.

The left and right lamps 50L, 50R are mounted to the lamp receiving holes 31L, 31R of the functioning body 30 respectively so as to be capable of rotating and fixing at a predetermined position. In other words, as shown in FIG. 4, the three sliding members 34 attached to the functioning body 30 are positioned inwardly of the outer bezel 52, and the projections 34c provided on the supporting arms 34b are resiliently pressed against the spherical surface 52a. Accordingly, the outer bezel 52 can be rotated and fixed at the desired position with respect to the functioning body 30.

According to the interior illumination lamp 10 described above, the lamp 50 can be rotated and fixed at a given position with respect to the functioning body 30 by the sliding members 34 provided on the functioning body 30 being resiliently pressed against the spherical surface 52a provided on the outer bezel 52. In this case, since a resilient metal plate is used as the sliding member 34, the problem in the related art such that the sliding members 23 formed of felt as in the related art are worn or changed in properties by the temperature or deterioration with age, and hence the lamp cannot be fixed at the desired direction can be solved. Also, in comparison with the case in which the spring or the like is employed, increase in cost due to increase in number of the components can also be avoided.

Also, since a plurality of the sliding members 34 are provided at the radial positions on the spherical surface 52a, the lamp 50 can be rotated and fixed stably. In addition, with the provision of the guiding members 36 between the sliding members 34, the lamp 50 is prevented from rattling with respect to the functioning body 30 and hence can be rotated smoothly, and fixed reliably at a desired position. Since the sliding member 34 is formed substantially into a T-shape, a plurality of projections 34c can be provided along the spherical surface 52, and hence the spherical surface 52a can be supported reliably with a small number of sliding members 34. In addition, since the lamp 50 is supported by pressing the projections 34c against the spherical surface 52a, the lamp 50 can be rotated and fixed with respect to the functioning body 30 with a suitable friction.

Also, since the guiding members 36 are formed outside the ring members 33 of the lamp receiving holes 31L, 31R, even when an excessive force is exerted on the sliding members 34, unintended significant deformation can be constrained.

The interior illumination lamp 10 of the present invention is not limited to the above-described embodiment, and suitable modifications or improvements may be made.

Figure 8:
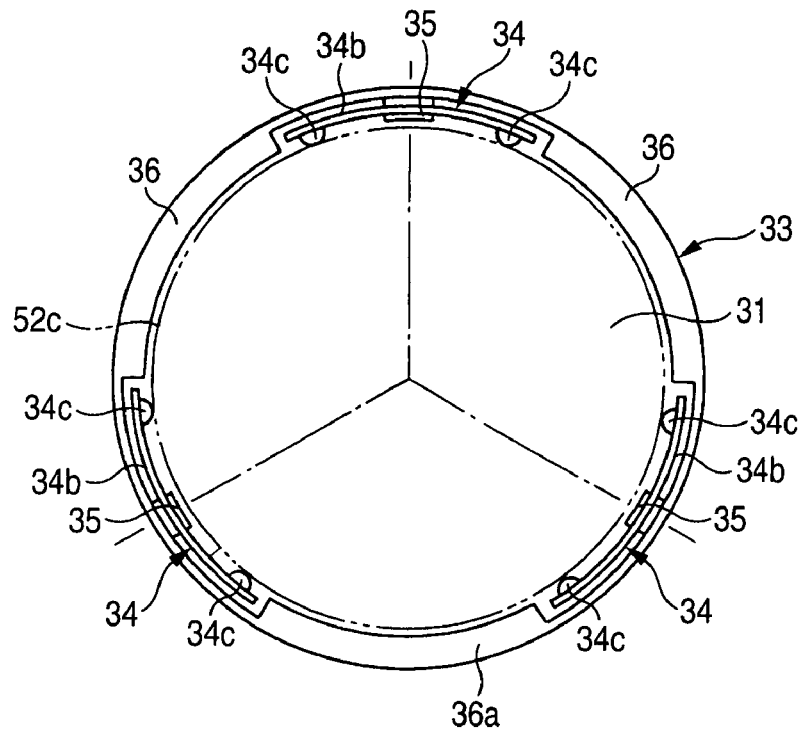
FIG. 8 is a front view showing a case in which a projecting spherical surface is provided on the outside of the bezel.
Figure 9:
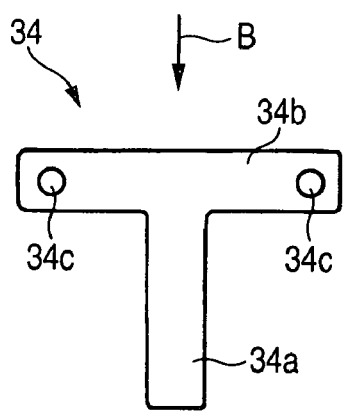
FIG. 9(A) is a front view of the sliding member.
FIG. 9(B) is a plan view of the sliding member.
Figure 9:
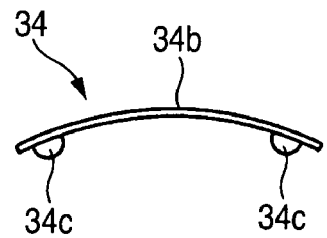
Figure 10:
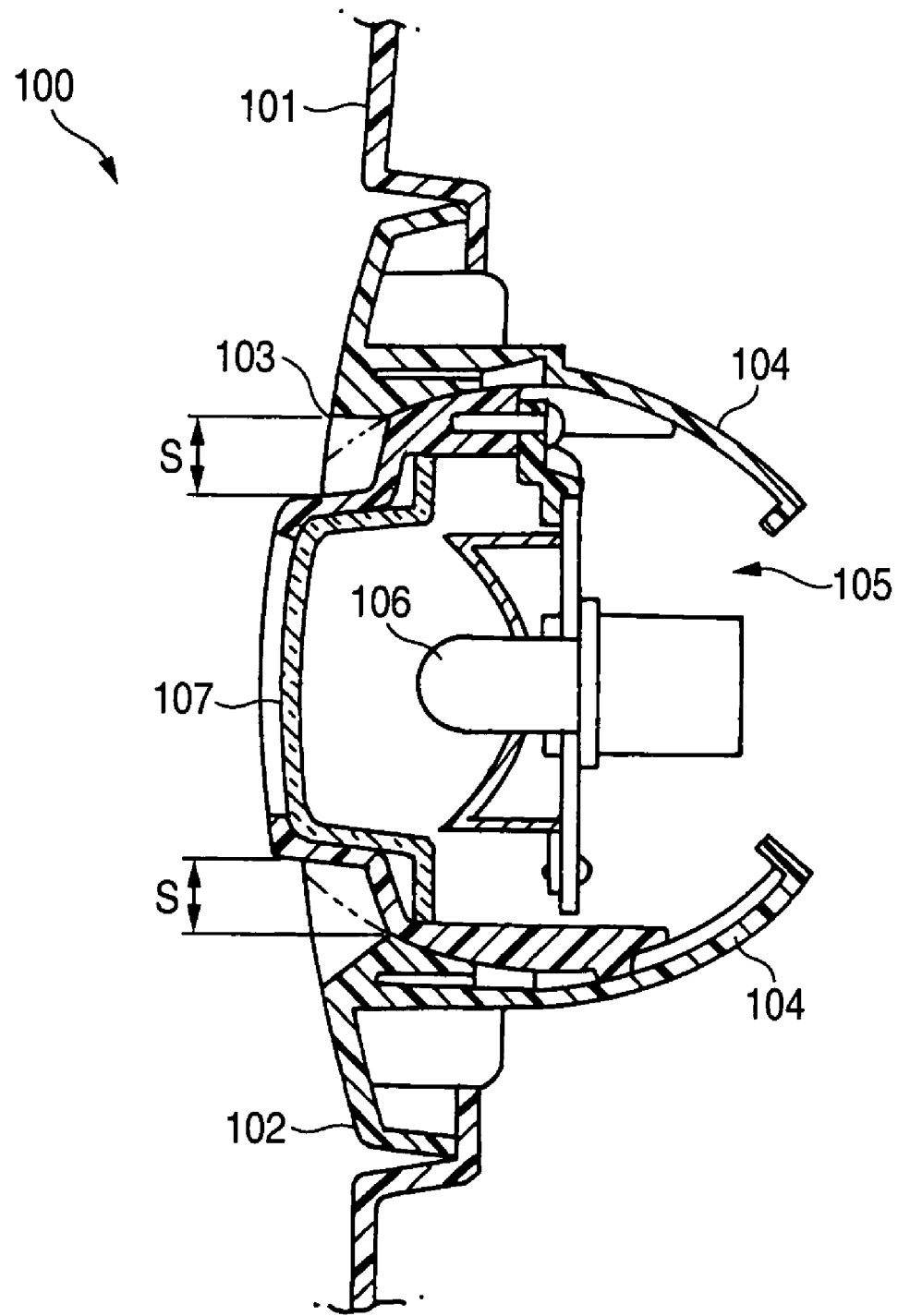
FIG. 10 is a cross-sectional view showing an example of the interior illumination lamp in the related art.

For example, although the case in which the recessed spherical surface 52a provided on the inner surface of the outer bezel 52 is pressed outward and hence rotatably supported by the siding members 34 attached to the functioning body 30 has been described in the above-described embodiment, it is also possible to provide a projecting spherical surface 52c on the outer surface of the outer bezel 52 for rotatably supporting with the sliding members 34 as shown in FIG. 8. In this case, as shown in FIGS. 9(A) and (B), the projection 34c is provided so as to project inwardly of the supporting arm 34b. In this way, the same operations and effects as those in the above-described embodiment are achieved.

In the embodiment described above, it is also possible to support the outer bezel 52 rotatably by providing a recessed spherical surface 52a on the inner surface of the outer bezel 52 as one of the members, and mounting the sliding members 34 to the functioning body 30 as the other member. Alternatively, it is also possible to provide the spherical surface 52a on the functional body 34 as one side and attach the sliding members 34 to the functional body 30 as the other side, so that the outer bezel 52 can be rotatably and fixably supported. In this configuration, the same operations and effects as in the embodiment described above are achieved.

Although the case in which the pair of left and right lamps 50L, 50R has been described in the embodiment described above, the number of lamps 50 are arbitrary. Therefore, the number of the lamp holes 23 and the number of switch holes 22 correspond to the number of the lamps 50, and are changed as need.

The materials, shapes, sizes, forms, numbers, and locations of the sliding member, the outer bezel, the inner bezel, the functioning body, the decorative member, and the frame shown in the above-described embodiment are arbitrary and are not limited as long as the present invention can be achieved.

What is claimed is:

1. An interior illumination lamp comprising:
   a main body to be fixed to a vehicle body;
   a bezel member being supported by a supporting member provided on the main body, the bezel member having a lens transmitting light from a light source;
   a spherical surface provided on one of the main body and the bezel member;
   a sliding member mounting recess formed on the other one of the main body and the bezel member; and
   a sliding member provided on the sliding member mounting recess, wherein the sliding member is formed substantially into a T-shape along the identical circumferential direction of the spherical surface and includes a supporting post attached to and inserted into the sliding member mounting recess and a supporting arm which is orthogonal to the supporting post and is curved into a partial circle, and opposite ends of the supporting arm are slidably contacted with the spherical surface to rotate the bezel member with respect to the main body so as to adjust the direction of the optical axis, and the sliding member can be resiliently pressed against the spherical surface.

2. An interior illumination lamp according to claim 1, wherein the sliding member slides with respect to a recessed spherical surface provided on the inner side of the bezel member.

3. An interior illumination lamp according to claim 1, wherein a plurality of the sliding members are provided at radial positions with respect to the spherical surface, and further comprising:
 a guiding member, for guiding the spherical surface, provided between the sliding members.

4. An interior illumination lamp according to claim 3, wherein each sliding member is formed substantially into a T-shape along the identical circumferential direction of the spherical surface.

5. An interior illumination lamp according to claim 1, wherein the sliding members include projections capable of bringing into a point contact with the spherical surface.

* * * * *